Dec. 13, 1966
C. H. TETZLOFF
3,290,765
APPARATUS FOR FORMING ARTICLES FROM SHEET MATERIAL
Original Filed Nov. 16, 1961
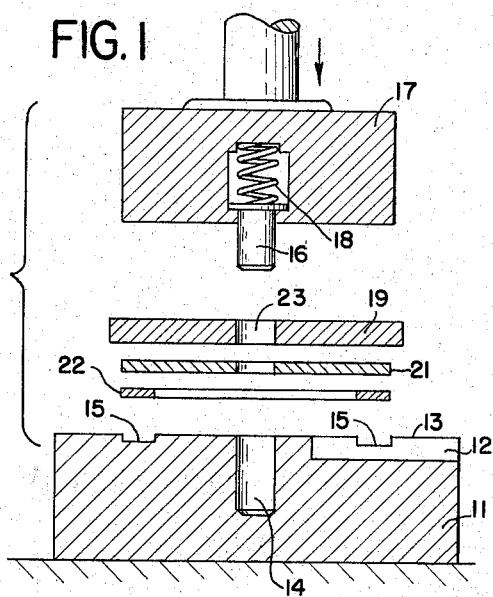
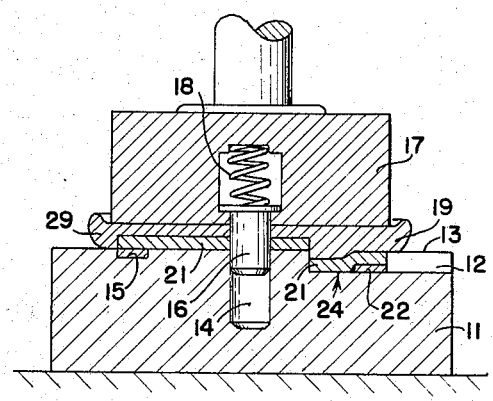
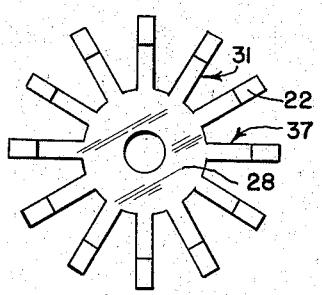
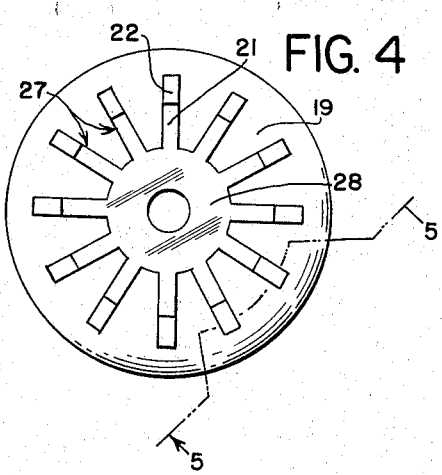
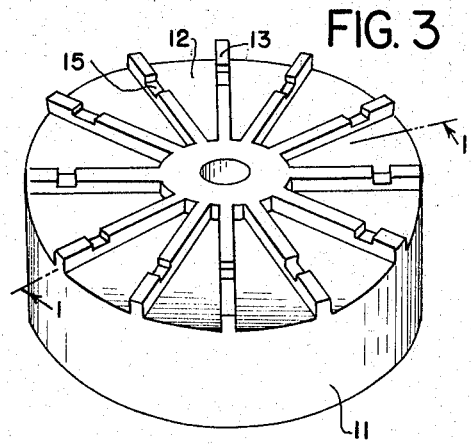
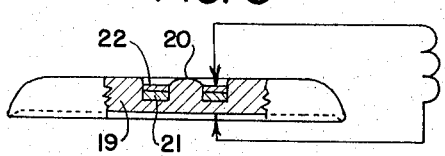
INVENTOR.
CARL H. TETZLOFF
BY Harold D. Jastram
ATTORNEY United States Patent Office 3,290,765
Patented Dec. 13, 1966

3,290,765
APPARATUS FOR FORMING ARTICLES FROM SHEET MATERIAL
Carl H. Tetzloff, Minneapolis, Minn., assignor to General Mills, Inc., a corporation of Delaware
Original application Nov. 16, 1961, Ser. No. 152,770, now Patent No. 3,146,524, dated Sept. 1, 1964. Divided and this application Dec. 10, 1963, Ser. No. 329,448
4 Claims. (Cl. 29—203)

This is a division of application Serial No. 152,770 filed November 16, 1961, now U.S. Patent No. 3,146,524.

This invention relates to methods of and apparatus for forming articles from sheet material and more particularly to methods of and apparatus for forming fragile electrical terminals from superimposed, thin sheet metal blanks using a deformable matrix.

The production of small parts such as electrical terminals from very thin metal sheets presents many fabricating problems due to the fact that the part may be of a very small size, it may be extremely fragile, and it may be formed of precious material which requires a high rate of waste recovery. Many prior known methods and apparatus for producing such articles have proven unsatisfactory because the thin metal sheet is often wrinkled, crimped, or otherwise deformed during the blanking operation. As an example, the well known male-female die arrangement involves precision fitting parts which must be milled at great expense and which produces a part with an upturned or wrinkled edge which must be removed. Such dies cannot be sharpened or reworked as economically as might be desirable. An added problem in the prior art arises from the need to handle and store fragile articles. Often articles must have additional parts welded or otherwise attached at various points on the article. Such additional work performed on the article usually requires a great deal of rough handling from which the article must be protected if it is to result in a satisfactory product.

An object of the invention is to provide a new and improved method and apparatus for forming articles.

Another object of the invention is to provide a new and improved method and apparatus for forming and handling fragile articles.

A further object of the present invention is to provide a method and apparatus for forming laminated metal articles from superimposed sheet material.

A still further object of the present invention is to provide a method and apparatus for forming laminated metal articles from superimposed sheet metal by forming the article and welding the superimposed sheets while the sheets remain in a work holder.

Another object of the present invention is to provide the method of producing fragile, stamped articles by using a deformable matrix material which captures the article and provides a container for the fragile article.

Another object of the present invention is to provide a method of producing stamped articles by extruding a matrix metal onto a male die.

A still further object of the present invention is to provide an apparatus for producing stamped articles which provides visual indication of the progress of the stamping or extruding operation.

A further object of the present invention is to provide apparatus for producing stamped articles which utilizes an unconfined, permanently deformable material for cutting and holding a stamped article.

Another object of the present invention is to provide apparatus for centering several metal sheets which are to be severed at predetermined points.

A method and apparatus illustrating certain features of the invention may include a die, a ram with an article positioning device, and a matrix material interposed between the ram and die. Several superimposed metal discs are placed over the die beneath a disc of matrix material which preferably is a metal such as aluminum. The ram is then forced into engagement with the matrix material and extrudes the matrix material into cavities in the die. As the matrix material is extruded, the metal sheets are severed by sharp edges of lands on the die face. Part of the severed sheets is forced into the cavities of the die while the remainder of the severed sheets, forming a useful article, is forced into the matrix material. The matrix material is then removed from the die with the embedded article of superimposed sheets. With the matrix material acting as a work holder, the superimposed metal is welded to form a unitary article after which the matrix material is removed from the article, preferably by etching the matrix material in an acid or a base solution, depending on the nature of the matrix material and the embedded part.

A complete understanding of the invention may be obtained from the following detailed description of a method and an apparatus forming a more specific embodiment of the invention when read in conjunction with the drawings, in which:

FIGURE 1 is an exploded sectional view of several metal blanks interposed between a ram and a die. The section of the die is taken along line 1—1 of FIG. 3;

FIGURE 2 is the same sectional view as in FIG. 1 and shows the ram engaging the metal blanks and forcing the metal into cavities of the die;

FIGURE 3 is a perspective view of a die such as that used in FIGS. 1 and 2;

FIGURE 4 is a bottom view of a stamped article embedded in the matrix material and which is in cross section in FIG. 2;

FIGURE 5 is a partial cross section of the stamped article illustrating the relationship of superimposed metal sheets embedded in the matrix material and;

FIGURE 6 is a plan view of the finished article separated from the matrix material.

Referring first to FIG. 1, there is illustrated an exploded view indicating the relationship of the mechanism which performs the blanking operation with interposed sheet metal blanks. A male die 11 contains a number of cavities 12 in the top surface with associated lands 13. The edges of the lands are sharp so that metal is easily severed when forced against the irregular die surface. The die 11 is also provided with an opening 14, which may be an aperture, for receiving a centering device or dowel pin 16 which is mounted on ram 17. Dowel pin 16 is spring biased by a spring 18.

A matrix material blank 19 of nonresilient deformable material, that is, a material capable of assuming a permanent deformation under pressure, such as aluminum or an alloy thereof having adequate plasticity or malleability, is provided and serves to sever as well as contain a blanked article. Beneath the matrix blank 19 is placed a blank 21 of material preferably a metal such as beryllium copper which has a combination of good conductivity and high modulus of elasticity. Blank 21 is the material from which spring arms for a rotary electrical switch are stamped. Beneath the beryllium copper blank 21 is placed a washer or ring 22 of metal which has the characteristic of being highly resistant to corrosion and additionally is highly conductive of electricity. Such a metal would be gold, silver or some alloy of non-corrosive metals. Blank 22 provides the electrical contact points for electrical terminals which are cut from the beryllium copper blank 21. It is highly desirable to use non-corrosive contacts to reduce the contact resistance in electrical switches since it is well known that a large portion of the electrical resistance introduced ino an electrical circuit is introduced through the terminal contacts of mechanical devices such as switches.

Dowel pin 16 is positioned in aperture 23 of the matrix blank 19 to center the blank with respect to the ram 17 which in turn centers blank 19 with respect to the central axis of die 11 by engaging and entering opening 14. Dowel pin 16 also centers blank 21 in a like manner so that a uniform group of radially extending terminals 27 are severed from blank 21. Blank 22 must be positioned with respect to blank 21 so that blank 22 uniformly engages the outer periphery of blank 21. A shallow counter-bore 15 is provided in die 11 and blank 22 is placed into the counter-bore 15 to insure proper orientation of blank 22 with respect to blank 21.

Ram 17 moves downward as viewed in FIGURE 1 and forces blanks 19, 21 and 22 into engagement with the die 11. Sufficient force is exerted on ram 17 to force the matrix material 19 to flow or extrude through blanks 21 and 22 into the cavities 12 of the die 11. As the matrix material 19 flows into the cavities 12, the force from the ram 17 is transferred through matrix material 19 and portions of the blank 21 and blank 22 are forced into cavities 12. A displaced portion generally designated by numeral 24 of blanks 21 and 22 is severed from the blanks by the sharp edges of the lands 13. Portions of the blanks 21 and 22 which come to rest on top of the lands 13 are not severed but are embedded in the matrix blank 19 as the matrix material flows about the lands 13 and into the cavity 12. The embedded portions of the blanks are captured by the matrix material 20 (see FIG. 5) which flows into the cavities 12.

The resulting product is illustrated in FIGURES 4 and 5 of the drawings showing portions of the beryllium copper blank 21 and portions of the contact material blank 22 embedded in the matrix material blank 19. FIGURES 4 and 6 illustrate the pattern of an article formed or blanked from the blank 21. The radial extensions 27 form electrical terminals which will be used as electrical terminals in a rotary switch. A center portion 28 of the article which is the central portion of blank 21, remains with the terminal extensions 27 but is removed at a later stage when terminal extensions 27 are appropriately secured in position in a switch.

It should be particularly noted that the ram 17 may be somewhat smaller than the blank 19 of matrix material. As the ram 17 engages the matrix blank 19 and brings to force or extrude the matrix material to the cavities 12, the outer periphery 29 of blank 19 will curl thus indicating that the matrix material of blank 19 is being extruded into the cavities 12 of the die 11. This provides a visual indication of the progress of the blanking or extruding operation since no outer container is used to confine the matrix blank 19. The curled rim 29 of blank 19 also provides a convenient means of removing the blank 19 and embedded article from the die 11. Additionally the blank 19 serves not only as a means for severing the beryllium copper blank 21 and contact blank 22 but also furnishes a means of handling the rather delicate terminal extensions 27 for storage and subsequent welding operations without the possibility of destroying, wrinkling, or otherwise deforming the delicate terminal extensions.

After the blanking operation is completed, the severed portions of blank 22 are embedded in the matrix material 19 on top of the beryllium copper extensions 27 but there is no secure connection between the contact material 22 and the extensions 27. With the matrix blank 19 serving as a work holder, the precious metal contact is spot welded to the extensions 27 (see FIG. 5). After this operation the precious metal contacts are securely fastened to the terminal extensions 27 and the article is either ready for storage in the blank 19 or the article is ready for removal from the matrix blank 19 so that the extensions 27 may be used in a completed electrical switch.

The article generally designated by the number 31 and illustrated in FIG. 6 is removed from the matrix blank 19 by etching the matrix material so that the article 31 falls free of the blank 19. An acid or base etchant may be used to remove the article 31, dependent on the type of material which is utilized for the matrix material and determined by the type of material which is used for blanks 21 and 22. During the welding operation, the terminal contact of precious metal, the extensions 27 and the matrix material are all welded together but the weld between the beryllium copper extension 27 and the matrix material is released during the etching operation.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed:
1. An apparatus for blanking articles from superimposed metal sheets which comprises a stationary die having a surface with cavities and sharp cutting edges and having said metal sheets positioned over said surface, an unconfined metallic matrix material positioned over said metal sheets, and means for engaging said material and extruding said material into said cavities to sever an article from said sheets.

2. Apparatus according to claim 1 which includes a centering device mounted on said engaging means for positioning said material with respect to said metal sheets and centering said material and sheets over said die.

3. Apparatus according to claim 1 in which said material flows about said severed article to capture said article and provide a workholder for the article.

4. An apparatus for forming electrical terminals which comprises a die having a surface with cavities and terminal lands, a metallic matrix blank positioned near said surface of said die, an apertured terminal blank of metal engaging the surface of said matrix blank nearest said die, a contact blank of metal positioned to engage the periphery of said terminal blank and facing said die, a ram for extruding said matrix blank into said cavities to sever said terminal and contact blank to form said terminals and capture said terminals in said matrix blank, and means mounted on said ram for positioning said terminal and matrix blanks with respect to each other and with respect to said die.

References Cited by the Examiner
UNITED STATES PATENTS

| 1,128,532 | 2/1915 | Schmidt | 29—432 |
| 2,248,786 | 7/1941 | Rowe et al. | 72—324 |
| 2,949,088 | 8/1960 | Johnson | 29—432 |

CHARLES W. LANHAM, *Primary Examiner.*

RICHARD J. HERBST, *Examiner.*